Nov. 4, 1941.  G. B. SEITZ, JR  2,261,604
BOTTLE HOLDER
Filed Aug. 8, 1939  4 Sheets-Sheet 1
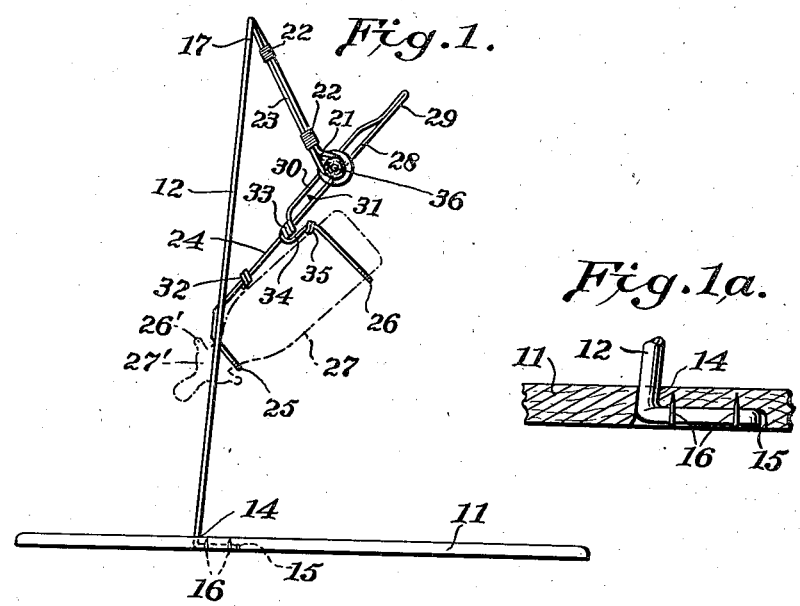
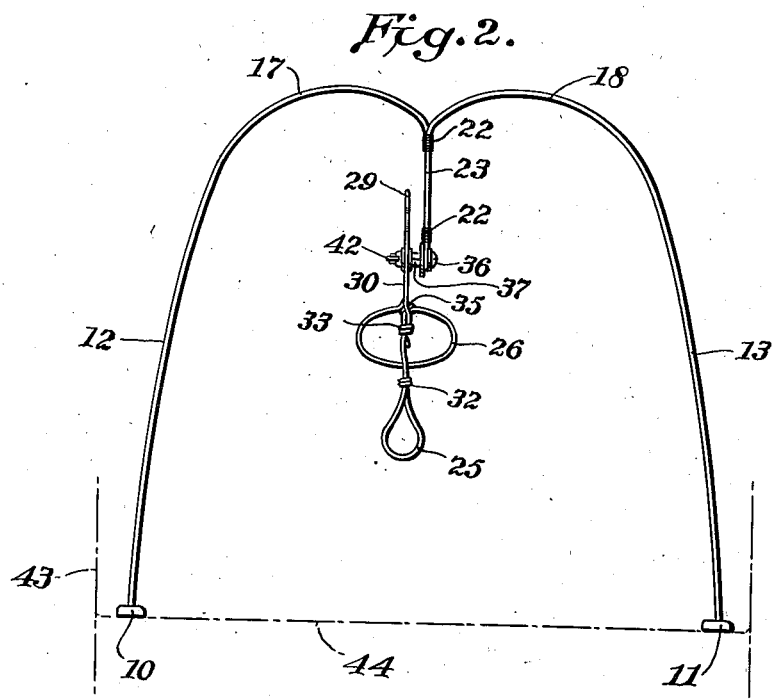
Inventor:
George B. Seitz, Jr.

Nov. 4, 1941.　　G. B. SEITZ, JR　　2,261,604
BOTTLE HOLDER
Filed Aug. 8, 1939　　4 Sheets-Sheet 2
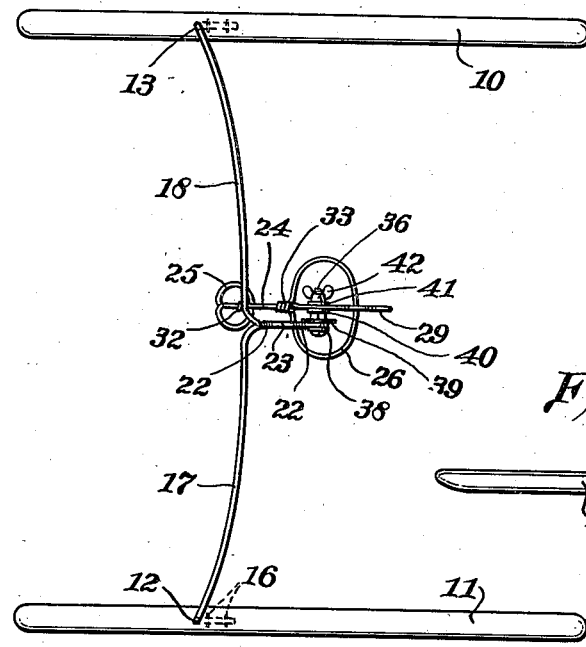
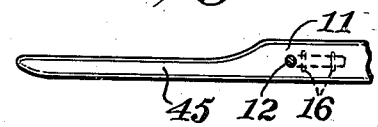
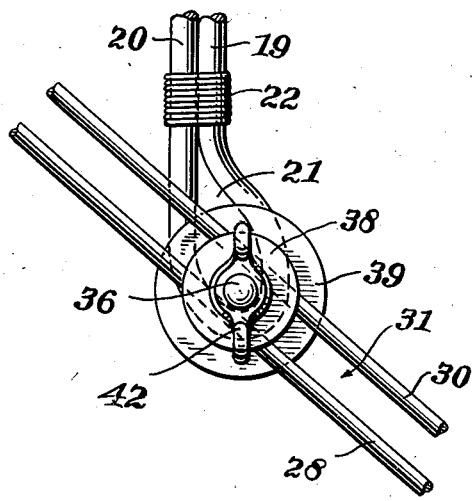
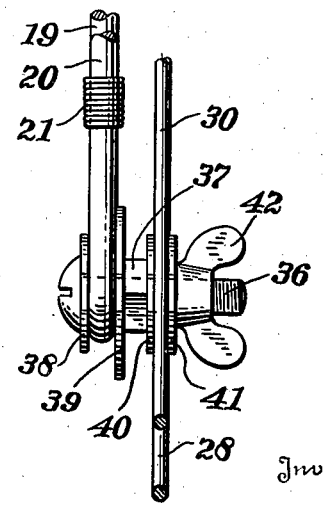
Inventor:
George B. Seitz, Jr.

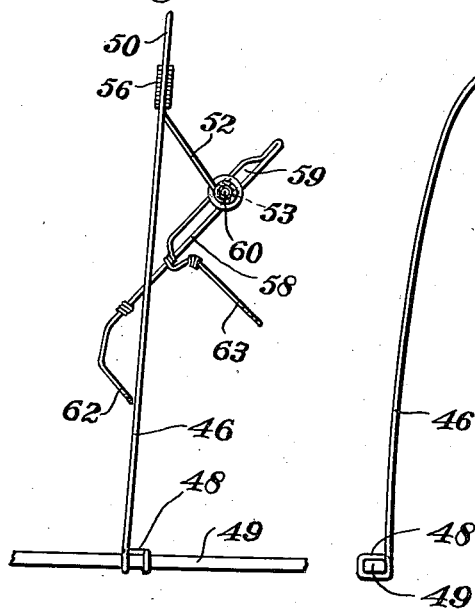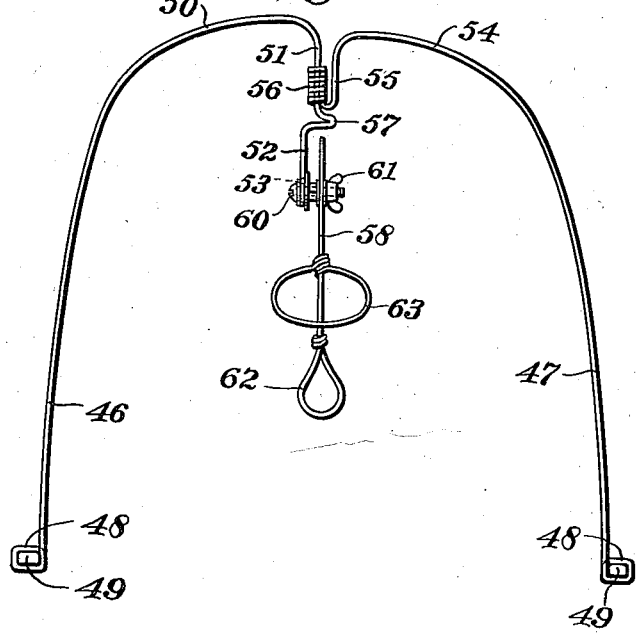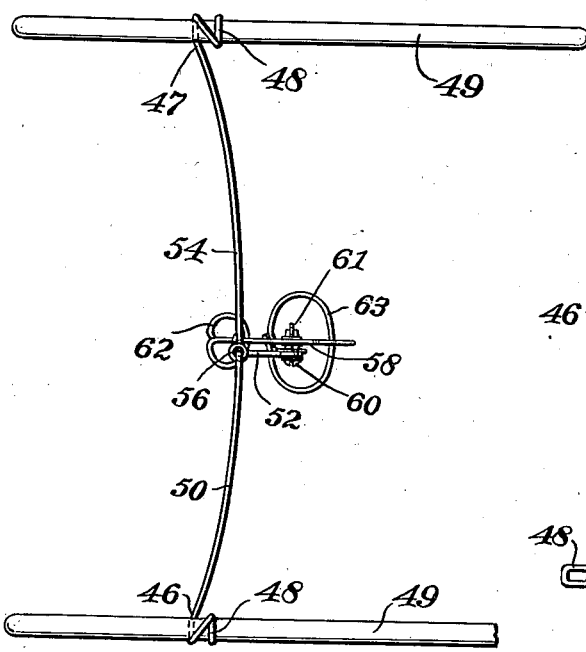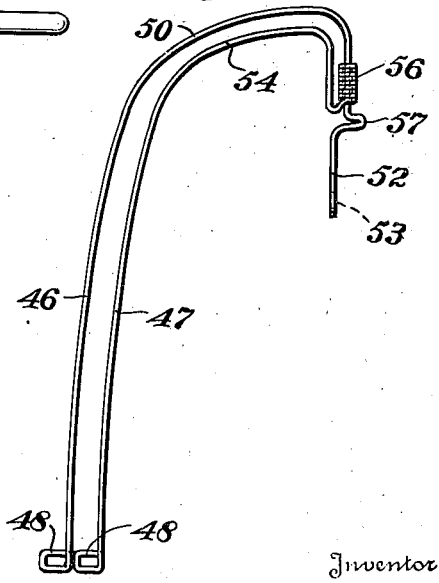

Nov. 4, 1941.  G. B. SEITZ, JR  2,261,604
BOTTLE HOLDER
Filed Aug. 8, 1939  4 Sheets-Sheet 4

Inventor:
George B. Seitz, Jr.
By Cushman, Darby & Cushman
Attorneys.

Patented Nov. 4, 1941

2,261,604

UNITED STATES PATENT OFFICE 2,261,604

BOTTLE HOLDER

George B. Seitz, Jr., West Los Angeles, Calif.

Application August 8, 1939, Serial No. 289,015

7 Claims. (Cl. 248—107)

The present invention relates to bottle holders and more particularly to improved means for supporting and maintaining a nursing bottle in a baby's mouth, in substantially the same manner as it would be positioned if held by hand.

Heretofore, in devices of this character, the bottle holder has been connected to the sides of a crib or carriage by clamping means, or the holder has been so constructed as to be capable of use with only certain types of beds or carriages.

An important object of the present invention is to provide a simple, efficient and economical bottle holder which may be moved from place to place and can be set and retained in any desired position, so as to be within convenient reach of the mouth of an infant lying in a baby carriage, bassinet or crib, or when the baby is in a recumbent position either in a bed or on the floor.

A further object consists in supporting a portable bottle holder by a pair of spaced base members or runners which are shaped and arranged to rest firmly on any suitable surface such as a bed or the like, and without requiring additional means for maintaining the holder in an upright position. The base members are disposed on opposite sides of the baby or person to be fed, and may be moved or adjusted so as not to interfere with the feeding of the baby. Further, the baby does not have to be moved or disturbed either to place the holder over him or to remove the holder from its feeding position.

Another object comprehends the provision of flexible means for connecting the bottle holder to the base members, so as to allow the nipple on the bottle to remain in the baby's mouth when he turns from side to side or changes his position. The flexible connecting means also permits the base members to be moved laterally toward or away from each other in order that the holder may conveniently fit in cribs or baby carriages of different sizes and widths. The holder is adjustably connected to the flexible means so that it may be tilted and maintained by gravity in different angular positions to insure the bottle being held at all times in proper feeding position.

A still further object consists in providing a light portable bottle holder with means which allows the parts of the holder to be collapsed or folded in order that the holder may be readily packed flat so as not to make a cumbersome package, and which may be quickly set up at a minimum expenditure of time and effort when it is desired to use the holder.

Other objects and advantages of the invention will become apparent from the following description when taken in conjunction with the accompanying claims and drawings.

Referring to the drawings in which are shown several preferred embodiments of the invention, Figure 1 is a side view of the bottle holder.

Figure 1a is a detail sectional view of one of the base members.

Figure 2 is a front view of Figure 1 showing the holder associated with a baby carriage, crib or the like.

Figure 3 is a plan view of Figure 1.

Figure 4 is a detail front view of the adjustable hinge connection.

Figure 5 is a side view of Figure 4.

Figure 6 is a side view of a modified form of the invention.

Figure 7 is a rear view of Figure 6.

Figure 8 is a plan view of Figure 6.

Figure 9 is a view showing the arms of the holder in their collapsed or folded positions.

Figure 10 is a detail view showing a modified form of a base member or runner for supporting the holder.

Figure 11:
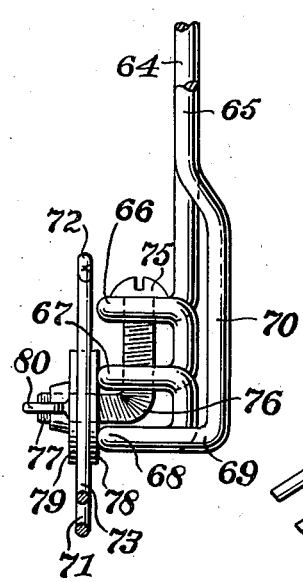
Figure 11 is a detail side view of a modified form of adjustable clamping means for securing the bottle cradle to the holder.

Referring to the drawings in which like numerals indicate like parts in the several views, the bottle holder comprises a pair of spaced elongated flat base members 10 and 11 (Figure 2) to which are secured the upwardly extending side arms or rods 12 and 13, preferably made in one piece and of flexible wire. The lower ends of the arms extend through openings 14 in each of the base members (Fig. 1a) and are bent so as to fit within a recess 15 on the underside of the base members so as to be secured therein by any suitable means such as the staples 16. The arms 12 and 13 are bent or curved inwardly towards each other as at 17 and 18 and are inclined downwardly to form the overlapped portions 19 and 20, which terminate at their lower end in a loop 21 (Fig. 4). The overlapped portions 19 and 20 are fastened together by any suitable means such as the spaced wire binding 22, so as to provide a relatively rigid medially disposed extension 23 of the arms 12 and 13.

A bottle cradle or retaining means 24 is arranged to be detachably and adjustably connected to the extension 23. As shown, the cradle is formed from a single piece of wire bent at its forward end to provide a small loop or ring 25 and at its opposite extremity a large loop 26, which are arranged to receive the neck and body respectively of a bottle 27 so as to releasably hold the same in position. The intermediate portion 28 of the cradle is bent upon itself as at 29 and has a spaced arm 30, which coacts with the portion 28 to form an elongated slot 31 arranged to register with the loop 21. The end of the loop 25 may be wrapped or twisted around the body portion of the cradle as at 32, while the portion 30 is wrapped around the body of the cradle as at 33 and has a portion 34 which is connected to the loop 26 and acts as a securing means for the end 35 of the loop. The cradle 24 is connected to the extension 23 so as to be maintained in any desired angular position by suitable clamping means such as a threaded bolt 36, which extends through the loop 21 and the slot 39 and which may be provided with a locking nut 37 disposed between the extension and the portion 29 of the cradle 24. Additionally, washers 38, 39, 40 and 41 may be provided for maintaining the bolt 36 and its associated parts in proper spaced position. A wing nut 42 threaded to the bolt 36 serves to maintain the holder in any predetermined fixed position. Thus, it will be seen that the bottle 27 may be adjusted and maintained at the proper height above the baby and at the proper angle for inserting the nipple into the baby's mouth upon the actuation of the wing nut 42. The height adjustment is effected by first loosening the nut 42, which allows the cradle 24 and the bottle 27 to be moved longitudinally and also to be tilted angularly, so as to assume the proper feeding position. These two adjustments may be made either simultaneously or separately. When the bottle is in the proper feeding position, the nut 42 is threaded on the bolt 36 so as to maintain the bottle at the desired angle.

The bent end portion 29 of the cradle is shaped to provide a handle which serves, when grasped, to move the cradle to its different adjusted positions. Due to the fact that the loops 25 and 26 loosely engage the bottle, the latter may be readily inserted or removed without disturbing the baby or the clamping connection of the cradle with the holder. In other words, the bottle may be inserted in the cradle when the latter is in either its horizontal or inclined feeding position. However, when the bottle is carried by the cradle in its inclined position, gravity acts to maintain it in firm engagement with the loops 25 and 26 to insure the bottle being held adjacent the mouth of the baby.

The nipple 27' applied to the bottle 27 may be of any well known and conventional type, and the loop 25 is wide enough so that the nipple will freely slip through the loop. The nipple 27' may be provided with a rubber bit 26' that bends or yields as the nipple is inserted through the loop 25 to provide means for causing the bottle to be easily inserted or removed from the cradle.

The side arms 12 and 13 are sufficiently flexible to insure the nipple remaining in the mouth of the infant when he turns or changes his position. In Figure 2, the holder is shown associated with a baby carriage, bassinet, crib or the like 43 and has the base members 10 and 11 resting or firmly supported on the bottom 44 so as to be disposed on opposite sides of the baby in order that the bottle 27 may be adjusted to the proper longitudinal and angular position to insure proper feeding. Due to the flexibility of the side arms 12 and 13, it will be seen that the base members 10 and 11 may be moved towards or away from each other, so that the holder may conveniently fit in bassinets, cribs or baby carriages of different sizes and widths. As will be seen from Figure 1a, the top of each of the base members 10 and 11 has a smooth surface and has no sharp or rough projections, thus eliminating the danger of parts of the baby's body which might contact therewith from being scratched or cut and also for preventing bed clothing or garments from being torn, or catching thereon.

The base members 10 and 11 may be made of wood or any other light material and are of such length and shape as to insure the holder being maintained firmly in a fixed position either in a baby carriage, bassinet or crib, or when the holder is supported in a bed or on the floor. As shown in Figure 10, the ends of each of the base members 10 and 11 positioned adjacent the head and arms of the infant, may be reduced as at 45.

In the modification disclosed in Figures 6 and 7, the holder is arranged to be collapsed or folded so as to assume a compact shape when not in use, in order that it may be easily packed flat and conveniently carried from place to place. In this form, one of the flexible side arms such as 46 is preferably slightly larger than its complementary arm 47. The lower ends of the arms are bent outwardly to form the retaining loops or openings 48, which removably receive the spaced base members 49 to support the holder in its operative position. The arm 46 extends upwardly from one of the base members 48 and is bent inwardly as at 50 and downwardly and outwardly as at 51 to provide a depending inclined portion or extension 52 formed at its lower end with a loop 53. The smaller side arm 47 is likewise bent inwardly as at 54 and has a depending portion 55, which is bent upwardly and loosely wrapped around the portion 51 of the arm 46 as at 56, to provide a pivotal or swivel connection for securing the arms together. The portion 51 immediately below the pivotal connection 56 may be bent laterally to provide a shoulder 57 for limiting the downward movement of the arm 47 relative to the arm 46 when the parts are set up. The bottle cradle or retaining means 58, is substantially similar in construction to the cradle 24 and has an elongated opening 59 arranged to register with the loop 53 and may be maintained in any desired angular and longitudinal position by the threaded bolt 60 which extends through the loop 53 and the opening 59 and has secured to the end thereof, a wing nut 61 for adjustably maintaining the holder above the baby in the proper feeding position. The spaced depending loops 62 and 63 formed on the cradle or clamping member 58 are arranged to receive the neck and body respectively of the bottle for releasably holding the same. It will be seen that the collapsible holder may be readily set up, so as to assume the position shown in Figures 6 and 7 or may be folded to the compact position shown in Figure 9 when the cradle 58 is disconnected from the arm 52 and the runners 49 withdrawn from the loops 48, so as to allow the parts of the holder to be packed or conveniently carried from place to place.

The spaced base members constitute means for supporting the holder on any suitable surface such as a bed or the floor, so that the bottle carried by the holder may assume the proper inclined position to feed the baby and allow the same freedom of movement of the bottle as it would have if held by hand. Further, due to the lateral adjustment of the base members relative to each other, the bottle holder will accommodate itself to any size or shape of crib or carriage, and can be adjusted by the clamping nut to be held in the proper feeding position.

The length of the base members 49 is such as to constitute a contacting surface which prevents accidental movement of the holder when once it is set up. If desired, a blanket used for covering the body of the baby may be tucked in under the base members, so as to be prevented from being thrown off by movement of the baby. The holder is of such size and width as to permit free movement of the baby without danger of the bottle being withdrawn from his mouth, and when not in use, it may be folded so as to assume the compact shape shown in Figure 9.

Figure 12:
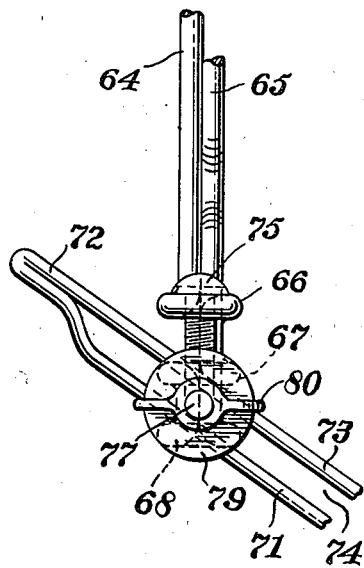
Figure 12 is a front view of Figure 11.
Figure 13:
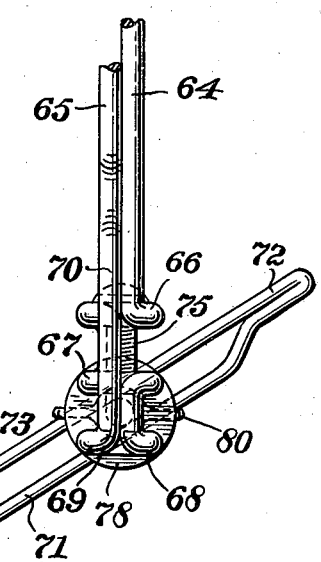
Figure 13 is a rear view of Figure 12.

In Figures 11, 12, and 13, there is shown a modified form of clamping means for adjustably connecting the bottle cradle to a holder such as disclosed in Figure 1, and which is constructed and arranged to enable the bottle to be rotated and maintained in any angular position and at the proper height above the baby by the operation of a single clamping means. In this form, the overlapped arms or rods 64 and 65 project downwardly and away from the side arms of the holder (not shown) in substantially the same manner as the inclined extension 23 (Figure 1). The lower portion of the arm 64 is bent to form the laterally spaced vertically aligned loops or rings 66, 67, and 68 (Figure 11) and then is bent upwardly as at 69 (Figure 11) to provide the offset portion 70 which merges into the arm 65. The intermediate portion 71 of the bottle cradle is bent to form a handle 72 and has spaced arms 73 which form an elongated slot or opening 74 and is substantially similar in construction to the parts of the cradle 24 shown in Figure 1. A bolt 75 extends through the vertically aligned loops 66 and 67 and is then bent at right angles as at 76 to provide a horizontally threaded shank 77, which extends outwardly between the spaced loops 67 and 68 (Figure 11). It will be seen that the bolt 75 has a swivel or rotatable connection with the loops 66 and 67 to permit the shank 77 to swing in a horizontal arc of about 330°. The shank 77 is arranged to extend through the elongated slot 74 of the bottle cradle and carries spaced washers 78 and 79 disposed on opposite sides of the arms 73, so that upon the tightening of the wing nut 80 on the threaded shank 77, the washer 78 will be forced into frictional engagement with the adjacent sides of the loops 67 and 68 to firmly maintain the bolt 75 in a fixed position. At the same time, the washer 79 will coact with the washer 78 to secure the arm 73 and the bottle cradle in its desired adjusted position. Thus, it will be seen that the bottle carried by the holder may be rotated upon the loosening of the wing nut 80 to the desired horizontal position and also can be adjusted to the proper height above the baby by a single operation.

Figure 14:
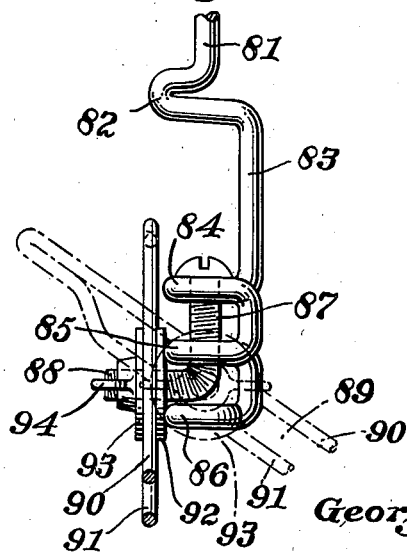
Figure 14 is a detail side view showing a modified form of clamping means associated with a collapsible holder such as disclosed in Figure 6.

In the form of the invention shown in Figure 14, a universal joint clamp is shown associated with a foldable holder such as disclosed in Figure 6. In this form, the depending arm 81 which extends downwardly and outwardly from one of the supporting arms of the holder, is bent as at 82 to form a depending portion 83 which is provided with the laterally spaced loops 84, 85, and 86. A threaded bolt 87 extends through the spaced loops 84 and 85 and has a horizontally disposed shank 88 which projects through the elongated opening 89 between the spaced arms 90 and 91 of the bottle cradle, and is adjustably clamped thereto through the instrumentality of the spaced washers 92 and 93 and the wing nut 94. When the nut 94 is tightened on the shank 88, the bottle cradle may be maintained in the proper feeding position such as shown in full lines or if desired the shank 88 upon loosening of the nut 94 may be swung horizontally so that the inner washer 92 may bear against the sides of the loops 85 and 86 in the manner as shown in dotted lines in this figure.

Thus, a substantially universal clamping means is provided to maintain the bottle cradle in its desired feeding position and can be rotated or adjusted vertically by a single operation. Further, this clamping means may be readily associated with either a non-folding type of holder as shown in Figure 1, or a holder of the collapsible type as disclosed in Figure 6.

It will be seen that my improved bottle holder may be used with equal efficiency for feeding a baby while lying in a crib or on the floor and that the parts are so constructed and arranged as to allow the nipple to remain in the mouth of the baby when he turns or moves as he customarily does during feeding. Due to the simplicity and minimum number of parts, the holder may be economically made, yet is so efficient in use as to be capable of meeting all the essential requirements a device of this character should possess. While the holder is primarily adapted for feeding babies, it will be manifest that it may also be used for supplying liquid food to the sick and others incapable of feeding themselves.

It is to be understood that the forms of the invention shown and described are merely illustrative of preferred embodiments, and that such changes may be made as fall within the purview of one skilled in the art, without departing from the spirit of the invention and the scope of the appended claims.

I claim:

1. A bottle holder of the class described, including spaced arms having upwardly extending portions bent inwardly towards each other, the bent portions of said arms being medially inclined downwardly in overlapping relation to each other and terminating in a loop portion, a cradle having spaced means for receiving and holding a bottle therein, said cradle having a rearwardly extending portion provided with an elongated opening, and means extending through said loop portion and said opening for adjustably maintaining the bottle in a fixed position.

2. A foldable holder for nursing bottles including a pair of spaced members, arms extending upwardly from said members and arranged to be detachably connected thereto, said arms being bent inwardly towards each other, the bent portion of one of the arms having a depending member, means pivotally connecting the bent portion of the other arm to said depending member, a bottle cradle, and means adjustably connecting the bottle cradle to the depending member to maintain the bottle in a fixed position.

3. A foldable holder for nursing bottles, including a pair of spaced base members, each of said members having a detachable arm extending upwardly therefrom, said arms being curved inwardly towards each other, the curved portion of one arm having a depending portion terminating in an inclined portion, means pivotally connecting the curve portion of the other arm to said depending portion, a bottle cradle, and means adjustably connecting the bottle cradle to said inclined portion to maintain the bottle in a fixed position.

4. A holder for bottles including a pair of spaced arms, said arms being bent inwardly toward each other and terminating in a medially disposed depending portion, bottle retaining means, said depending portion being bent to provide vertically spaced loops extending laterally therefrom, a bolt extending through certain of said loops and having a substantially horizontally disposed shank projecting outwardly therefrom, said retaining means having an elongated opening through which said shank extends, means for clamping the bottle retaining means to said depending portion, and means on said shank and engaging the depending portion to permit rotatable adjustment of the retaining means.

5. A holder for bottles including a pair of spaced arms, said arms being bent inwardly at their upper ends toward each other and terminating in a medially disposed inclined depending portion, bottle retaining means, said depending portion bent to provide three vertically spaced loops which extend laterally therefrom, a bolt extending through two of said loops and having a substantially horizontally disposed shank projecting outwardly of the loops, said bottle retaining means having an elongated opening arranged to receive said shank, a clamping nut threaded to the shank, and means between the retaining means and the holder and arranged to bear against two of the loops when the clamping nut is applied to maintain the retaining means in any desired adjusted position, said bolt when the clamping nut is released being rotatable to permit the retaining means to be moved to different horizontal positions.

6. A holder for bottles including a pair of spaced elongated substantially flat base members arranged to rest firmly on a supporting surface, each of said members having a flexible arm extending upwardly therefrom, the arms being bent inwardly toward each other and terminating in a medially disposed depending portion, bottle retaining means, and means for adjustably connecting the retaining means to said depending portion to maintain the bottle in a fixed position, the flexible arms allowing the base members to be moved laterally relative to each other so as to vary the width therebetween.

7. A holder for bottles including a pair of spaced elongated substantially flat base members arranged to rest firmly on a supporting surface, each of said members having a flexible arm extending upwardly therefrom, the arms being bent inwardly toward each other and terminating in a medially disposed depending portion inclined outwardly from the arms, a cradle having spaced means for receiving and removably holding a bottle therein, the bottle, when the cradle is in its inclined position, being held by gravity in proper feeding position, said cradle having a rearwardly extending handle, a clamping means for adjustably connecting the cradle to said inclined portion, said rearwardly extending handle constituting means to facilitate the manual movement of the cradle to its different adjusted positions, and said flexible arms allowing the base members to be moved laterally relative to each other so as to vary the width therebetween.

GEORGE B. SEITZ, Jr.